(12) United States Patent
Yamada (10) Patent No.: US 6,276,766 B1
(45) Date of Patent: Aug. 21, 2001

(54) BRAKE SYSTEM FOR BEHAVIOR CONTROL OF VEHICLE HAVING PUMP TO START ON FORECAST OF EXECUTION OF CONTROL BY A PLURALITY OF PARAMETERS

(75) Inventor: Yoshihisa Yamada, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/036,019

(22) Filed: Mar. 6, 1998

(30) Foreign Application Priority Data

Apr. 3, 1997 (JP) .................................................. 9-101050

(51) Int. Cl.$^7$ ....................................................... B60T 8/60
(52) U.S. Cl. ........................ 303/154; 303/146; 303/113.2
(58) Field of Search ..................... 303/140, 146, 303/147, 148, 154, 113.2, 113.1, 116.1, 119.1

(56) References Cited

U.S. PATENT DOCUMENTS

| 4,861,118 | 8/1989 | Burckhardt et al. ............. 303/113.2 |
| 5,054,861 | 10/1991 | Resch ................................ 303/113.2 |
| 5,061,017 | 10/1991 | Kirstein ............................. 303/113.2 |
| 5,236,256 | 8/1993 | Schmidt et al. .................... 303/113.2 |
| 5,332,056 | 7/1994 | Niibe et al. ........................ 303/114.3 |
| 5,342,120 | 8/1994 | Zimmer et al. .................... 303/113.2 |
| 5,586,814 | 12/1996 | Steiner ............................... 303/113.2 |
| 5,645,326 | * 7/1997 | Sano .................................. 303/140 |
| 5,711,585 | * 1/1998 | Tozu et al. ......................... 303/146 |
| 5,717,591 | * 2/1998 | Okada et al. ...................... 303/139 |
| 5,735,585 | * 4/1998 | Koike et al. ....................... 303/145 |
| 5,782,543 | * 7/1998 | Monzaki et al. ................... 303/140 |
| 5,797,663 | * 8/1998 | Kawaguchi et al. ............... 303/146 |
| 6,012,783 | 1/2000 | Schwarzer et al. ................ 303/140 |

FOREIGN PATENT DOCUMENTS

| 38 39 178 | 8/1989 | (DE) . |
| 40 37 468 | 5/1992 | (DE) . |
| 43 12 118 | 10/1993 | (DE) . |
| 43 29 140 | 12/1994 | (DE) . |
| 195 35 623 A1 | 4/1996 | (DE) . |
| 195 13 128 A1 | 10/1996 | (DE) . |
| 196 26 395 A1 | 2/1997 | (DE) . |
| A-8-150919 | 6/1996 | (JP) . |
| 09011876 A | 1/1997 | (JP) . |

* cited by examiner

Primary Examiner—Christopher P. Schwartz
Assistant Examiner—Thomas J. Williams
(74) Attorney, Agent, or Firm—Oliff & Berridge, PLC (57) ABSTRACT

A brake system of a vehicle for a vehicle behavior stabilizing control has a working fluid circuit including wheel cylinders, a pump to produce a raised pressure source of a working fluid without an accumulator, fluid flow control valves for selectively supplying the working fluid from the raised pressure source to each wheel cylinder for applying braking, and an automatic controller for controlling the pump and the fluid flow control valves, wherein the automatic controller starts to operate the pump when a first parameter suggestive of a first running condition of the vehicle increases across its threshold value and starts to operate the fluid flow control valves for the vehicle behavior stabilizing control when a second parameter suggestive of a second running condition of the vehicle increases across its threshold value.

8 Claims, 8 Drawing Sheets

BRAKE SYSTEM FOR BEHAVIOR CONTROL OF VEHICLE HAVING PUMP TO START ON FORECAST OF EXECUTION OF CONTROL BY A PLURALITY OF PARAMETERS

BACKGROUND OF THE INVENTION

1. Field of the Invention

The present invention relates to a brake system of a vehicle such as an automobile, and more particularly, to a brake system for a behavior control of a vehicle, incorporating a pump for pressurizing a working fluid of the brake system, the pump being started before the start of the behavior control to provide a raised pressure source of the working fluid ready for the behavior control without any substantial accumulator therefor.

2. Description of the Prior Art

By Japanese Patent Application 7-201779 laid open to public as Laid-open Publication 8-150919 and having counterparts in U.S.A. and Germany as U.S. Pat. No. 5,797,663 and German Patent Application No. P19535623.3-21, respectively, there has been proposed a brake system for a behavior control of a vehicle such as an automobile adapted to operate with an automatic control means which controls a pump and a plurality of fluid flow control valves based upon a parameter representing a liability of the vehicle to an unstabilized running behavior, the pump generating a raised pressure source of a working fluid by operation, while the fluid flow control valves dealing with the raised pressure source to supply a raised pressure to selected one or ones of four wheels, so as, for example, to brake a front wheel at the outside of a turn running of the vehicle when it is liable to a spin, wherein the invention resides in that the brake system dispenses with the conventional accumulator for the pressurized working fluid by the pump being started to operate according to a forecast of the vehicle being put into the unstabilized behavior estimated by the automatic control means based upon the above-mentioned parameter approaching to a first predetermined value thereof indicating a probability of the occurrence of the unstabilized behavior so that a raised pressure source of the working fluid is immediately available with no substantial accumulator therefor when the automatic control means decides to supply the working fluid at a raised pressure to a wheel cylinder or cylinders of a particular wheel or wheels for execution of a stability control.

In the above-mentioned prior art, it is proposed to check if a parameter such as the slip angle of the vehicle body representing the liability of the vehicle to a spin has exceeded a first predetermined threshold value thereof to start the operation of the pump and to check if the parameter has exceeded a second predetermined threshold value thereof to start the execution of the stability control, the second threshold value being higher than the first threshold value.

SUMMARY OF THE INVENTION

In the meantime, the present inventor contemplated that, if the parameter for starting the pump operation is selected judiciously to be different from the parameter for starting the execution of the behavior control, a higher flexibility and versatility of the control performance should be available than in the above-mentioned prior art, accomplishing a better adaptation of the time for starting the pump operation to the actual need of a raised pressure source of the working fluid.

In view of the above, it is a primary object of the present invention to provide a brake system operable with no substantial accumulator for the raised pressure source of working fluid for selectively applying a braking to a selected wheel or wheels of a vehicle for the purpose of stabilizing the running behavior thereof with a higher adaptation performance of starting pump operation for providing a raised pressure source of the working fluid to the actual use of the raised pressure source of the working fluid.

According to the present invention, the above-mentioned primary object of the present invention is accomplished by a brake system of a vehicle having a vehicle body and front left, front right, rear left and rear right wheels, comprising a reservoir, a plurality of wheel cylinders each adapted to apply a braking force to a corresponding one of the front left, front right, rear left and rear right wheels when supplied with a working fluid at a raised pressure, an inlet passage means adapted to supply the working fluid to said wheel cylinders, a pump means for pumping the working fluid from said reservoir to said inlet passage means to provide a raised pressure source of the working fluid in said passage means, fluid circuit means including fluid flow control valves for selectively conducting the working fluid from said inlet passage means to each one of said wheel cylinders, and an automatic control means for controlling said pump means and said fluid flow control valves, wherein said automatic control means comprises a first means for obtaining a first parameter related to running of the vehicle, and a second means for obtaining a second parameter different from said first parameter related to running of the vehicle in a time-based changing performance thereof, said first and second parameters each relating to a probable requirement for applying braking force to at least one wheel selected from the front left, front might, rear left and rear might wheels for a stability control of the vehicle by successively reaching first and second threshold values, respectively, in said order according to an increase in need for stability control, said automatic control means controlling said pump means and said fluid flow control valves such that, when said first parameter reaches said first threshold value, said pump means is started for operation thereof so as to provide said raised pressure source in said inlet passage means while said flow control valves deal with said raised pressure source not to supply any of the wheel cylinders with such a raised pressure based upon said raised pressure source as to effect a substantial braking thereby, and when said second parameter reaches said second threshold value, the wheel cylinder or cylinders corresponding to said selected wheel or wheels are supplied with such a raised pressure based upon said raised pressure source as to effect a substantial braking thereby.

By selecting the parameter for starting the pump operation to be different from that for starting the substantial operation of the brake system, it is now possible to start the pump operation based upon a checking of such a parameter that is not indicative of the degree of a movement of the vehicle which leads to an unstabilized behavior of the vehicle but is a more primary factor which induces such a movement of the vehicle.

So in the brake system of the above-mentioned construction, said first parameter may be a longitudinal slip ratio of a rear wheel operating at the inside of a turn running of the vehicle, while said second parameter may be the absolute value of a spin value based upon slip angle of the vehicle body representing a liability of the vehicle to spin, said automatic control means controlling said flow control valves so as to supply said raised pressure to effect said substantial braking to either the front left or front right wheel operating at the outside of the turn running of the vehicle, in order to suppress the vehicle from getting into a spin during a turn running with a braking.

In such a brake system, said automatic control means may stop said pump means once started when a predetermined time lapses after subsidence of the absolute value of said spin value below said second threshold value.

Or, in the brake system of the above-mentioned basic construction, when applied to a front steered vehicle having a front steering system, said first parameter may be the absolute value of a change rate of steering angle of the front steering system, while said second parameter may be the absolute value of a spin value based upon slip angle of the vehicle body representing a liability of the vehicle to spin, said automatic control means controlling said flow control valves so as to supply said raised pressure to effect said substantial braking to either the front left or front right wheel operating at the outside of the turn running of the vehicle, in order to suppress the vehicle from getting into a spin during a turn running with a braking.

In such a brake system, said automatic control means may stop said pump-means once started when a predetermined time lapses after subsidence of the absolute value of said spin value below said second threshold value.

In such a brake system, said automatic control means may detect the absolute value of the change rate of the steering angle to reach said first threshold value only when the absolute value of the steering angle is equal to or greater than a third threshold value for the steering angle.

Further, in such a brake system, said automatic control means may detect the absolute value of the steering angle to be equal to or greater than said third threshold value for the steering angle only when longitudinal slip ratio of the rear left or rear might wheel operating at the inside of the turn running of the vehicle is smaller than a fourth threshold value for the longitudinal slip ratio, while said automatic control means starting said pump means to operate when the longitudinal slip ratio of the rear left or rear might wheel operating at the inside of the turn running of the vehicle is equal to or greater than said fourth threshold value for the longitudinal slip ratio.

In the brake system of the above-mentioned basic construction, said automatic control means may control said fluid flow control valves so as to generate a circulation of the working fluid through said fluid circuit means by said raised pressure source in said inlet passage means when said first parameter has reached said first threshold value while said second parameter does not yet reached said second threshold value.

BRIEF DESCRIPTION OF THE DRAWINGS

In the accompanying drawings.

DESCRIPTION OF THE PREFERRED EMBODIMENT

In the following, the present invention will be described in more detail with respect to some embodiments thereof with reference to the accompanying drawings.

Figure 1A:
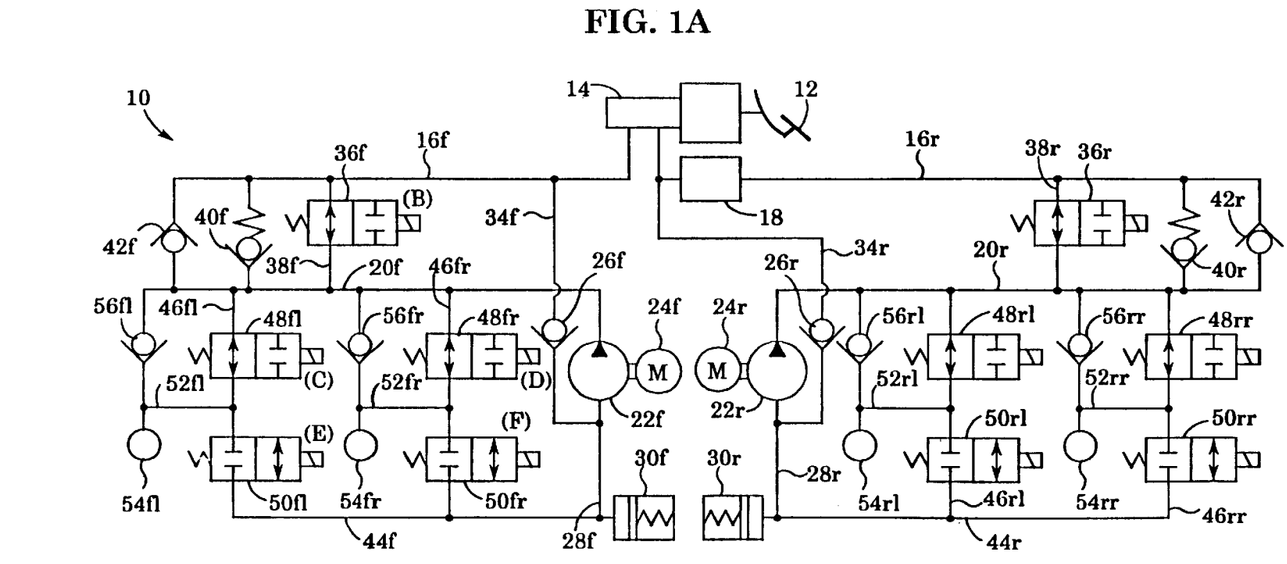
FIG. 1A is a diagrammatical view showing a hydraulic fluid circuit as an embodiment of the brake system according to the present invention.

Referring to FIG. 1A, the brake system generally designated by 10 comprises a master cylinder 14 adapted to be actuated by a depression of a brake pedal 12 by a driver to deliver a working fluid from first and second delivery ports thereof, the first port being connected with a working fluid passage 16$f$ for front wheels not shown in the figure, while the second port is connected, via a proportioning valve 18, with a working fluid passage 16$r$ for rear wheels not shown in the figure. The brake system 10 comprises pumps 22$f$ and 22$r$ for pumping the working fluid to deliver it at a raised pressure to a high-pressure working fluid passage 20$f$ for the front wheels and a high- working-fluid passage 20$r$ for the rear wheels, respectively. The pumps 22$f$ and 22$r$ are driven by electric motors 24$f$ and 24$r$, respectively, to draw up the working fluid through suction passages 28$f$ and 28$r$ from reservoirs 30$f$ and 30$r$, respectively.

The front working fluid passage 16$f$ is connected with the front highpressure working fluid passage 20$f$ by a passage 38$f$ including a changeover valve 36$f$. Further, the front working fluid passage 16$f$ is connected with the front high pressure passage 20$f$ by a parallel combination of a relief valve 40$f$ and a check valve 42$f$ mutually oriented in opposite directions. The changeover valve 36$f$ is a normally open (normally through) solenoid valve. The front working fluid passage 16$f$ is also connected with the suction passage 28$f$ by a passage 34$f$ including a check valve 26$f$ which allows the working fluid to flow only from the side of the suction passage 28$f$ to the front working fluid passage 16$f$.

Similarly, the rear working fluid passage 16$r$ is connected with the rear high working fluid pressure passage 20$r$ by a passage 38$r$ including a changeover valve 36$r$ which is also a normally open (normally through) solenoid valve. The rear working fluid passage 16$r$ is further connected with the rear high pressure working fluid passage 20$r$ by a parallel combination of a relief valve 40$r$ and a check valve 42$r$ mutually oriented in opposite directions. The suction passage 28$r$ is connected with the rear working fluid passage 16$r$ at a point upstream of the proportioning valve 18 or the master cylinder 14 by a passage 34$r$ including a check valve 26$r$ which allows the working fluid to flow only from the side of the suction passage 28$r$ to the rear working fluid passage 16$r$ or the master cylinder 14.

A return passage 44$f$ for the front vehicle wheels is connected to the reservoir 30$f$, and between the front high pressure working fluid passage 20f and the front return passage 44f, there are connected a changeover valve 48fl constructed as a normally open (normally through) solenoid valve and a changeover valve 50fl constructed as a normally closed (normally blocked) solenoid valve in series by a connection passage 46fl for the front left wheel, and also a changeover valve 48fr constructed as a normally open (normally through) solenoid valve and a changeover valve 50fr constructed as a normally closed (normally blocked) solenoid valve in series by a connection passage 46fr for the front right wheel.

A mid point of the connection passage 40 between the changeover valves 48fl and 50fl is connected with a wheel cylinder 54fl of the front left wheel by a connection passage 52fl, while the wheel cylinder 54fl is also connected with the front high pressure working fluid passage 20f by a check valve 56fl oriented to allow the working fluid to flow only from the wheel cylinder 54fl toward the front high pressure working fluid passage 20f. Similarly, a mid point of the connection passage 46fr between the changeover valves 48fr and 50fr is connected with a wheel cylinder 54fr of the front right wheel by a connection passage 52fr, while the wheel cylinder 54fr is also connected with the front high pressure working fluid passage 20f by a check valve 56fr oriented to allow the working fluid to flow only from the wheel cylinder 54fr toward the front high pressure working fluid passage 20f.

In the same manner as the fluid circuit for the front wheels, a return passage 44r for the rear wheels is connected to the reservoir 30r, and between the rear high pressure working fluid passage 20r and the return passage 44r, there are connected a changeover valve 48rl constructed as a normally open (normally through) solenoid valve and a changeover valve 50rl constructed as a normally closed (normally blocked) solenoid valve in series by a connection passage 46rl for the rear left wheel, and also a changeover valve 48rr constructed as a normally open (normally though) solenoid valve and a changeover valve 50rr constructed as a normally closed (normally blocked) solenoid valve in series by a connection passage 46rr.

A mid point of the connection passage 46rl between the changeover valves 48A and 50rl is connected with a wheel cylinder 54A of the rear left wheel by a connection passage 52rl, while the wheel cylinder 54rl is also connected with the-rear high pressure working fluid passage 20r by a check valve 56rl oriented to allow the working fluid to flow only from the wheel cylinder 54rl toward the rear high pressure working fluid passage 20r. Similarly, a mid point of the connection passage 46ff between the changeover valves 48rr and 50rr is connected with a wheel cylinder 54rr of the rear right wheel by a connection passage 52rr, while the wheel cylinder 54rr is also connected with the rear high pressure working fluid passage 20r by a check valve 56rr oriented to allow the working fluid to flow only from the wheel cylinder 54rr toward the rear high pressure working fluid passage 20r.

When the pumps 22f and 22r are driven, with the changeover valves 36f and 36r being closed and with the changeover valves 48fl, 48fr, 48rl and 48rr being maintained in the open position, the wheel cylinders 54fl, 54fr, 54rl and 54rr connected with the high pressure working fluid passages 20f and 20r, respectively, are supplied with the working fluid at a raised pressure. Conversely, regardless of changing over of the changeover valves 36f and 36r, when the changeover valves 48fl, 48fr, 48rl and 48rr are closed, while the changeover valve 50fl, 50fr, 50rl and 50rr are opened, the wheel cylinders 54fl, 54fr, 54rl and 54rr are connected with the return passages 44f and 44r, respectively, thereby being exhausted of the pressure therein. Further, regardless of changing over of the changeover valves 36f and 36r, when the changeover valve 50fl, 50fr, 50rl and 50rr are maintained at the closed position, while the changeover valves 48fl, 48fr, 48rl and 48rr are also closed, the wheel cylinders 54fl, 54fr, 54rl and 54rr are disconnected from both of the high pressure working fluid passages 20f and 20r and the return passages 44f and 44r, so as to maintain the pressure therein as unchanged.

Therefore, when the brake system 10 is in the condition shown in FIG. 1A, the wheel cylinders 54fl, 54fr, 54rl and 54rr generate braking forces in accordance with a depression of the brake pedal 12 by the driver, whereas when the changeover valves 36f and 36r are changed over to the closed position, the braking force of each of the front left, front right, rear left and rear right wheels is appropriately controlled by an open/close control of the changeover valves 48fl-48rr and 50fl-50rr, independently of the depression of the brake pedal 12 by the driver.

Figure 1B:
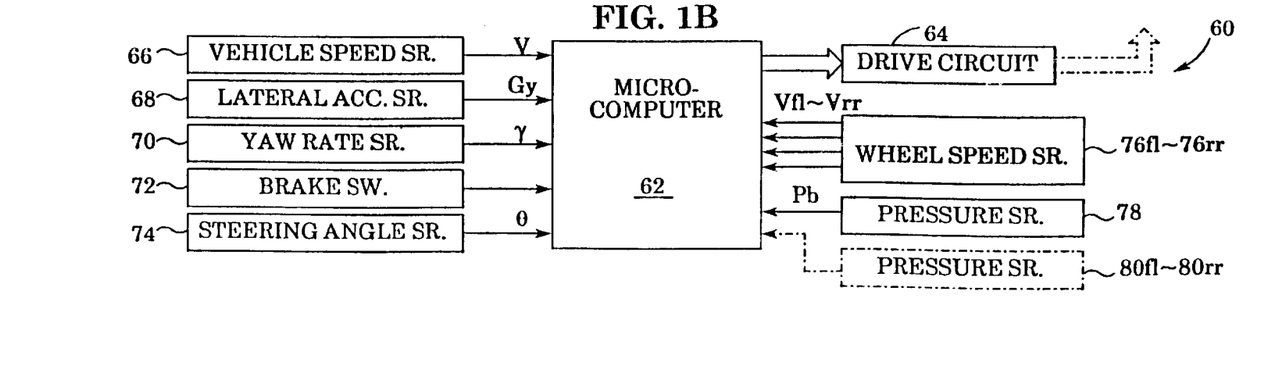
FIG. 1B is a diagrammatical view of a control means as an embodiment of the brake system according to the present invention.

The changeover valves 36f and 36r, the changeover valves 48fl-48rr and the changeover valves 50fl-50rr are controlled by an electric control means 60 diagrammatically shown in FIG. 1B. The electric control means 60 consists of a microcomputer 62 and a drive circuit 64. Although not shown in detail in the figure, the microcomputer 62 may be of a general construction having a central processing unit, a read only memory, a random access memory, input and output means, and a bi-directional common bus interconnecting those components.

The microcomputer 62 is supplied with signals indicating vehicle speed V from a vehicle speed sensor 66, lateral acceleration Gy of the vehicle body from a lateral acceleration sensor 68 mounted substantially at a center of gravity of the vehicle body, yaw rate γ of the vehicle body from a yaw rate sensor 70, a signal indicating on/off condition of a brake switch (BS) 72, steering angle θ of a steering system of the vehicle from a steering angle sensor 74, rotation speeds of the left and right front and rear wheels Vfl-Vrr from wheel speed sensors 76fl-76rr, and a pressure Pb of the working fluid in the front working fluid passage 16f from a pressure sensor 78. Further, in a modification of the brake system of the present invention described later, the microcomputer 62 is also supplied with signals indicating pressures of the working fluid in the respective wheel cylinders 54fl-54rr from pressure sensors 80fl-80rr.

In the following, several embodiments of the brake system according to the present invention having a hardware construction such as shown in FIGS. 1A and 1B will be described by means of operations thereof. In this connection, the read only memory of the microcomputer 62 stores various control programs and maps as described hereinbelow, while the central processing unit thereof conducts various calculations based upon those programs, maps and signals received on various parameters detected by the above-mentioned various sensors to estimate a running behavior of the vehicle, and instructs the drive circuit 64 to operate the pump 22f and/or the pump 22r and to changes over the various changeover valves 36f, etc. for execution of a behavior control of the vehicle based upon the calculation.

Figure 2:
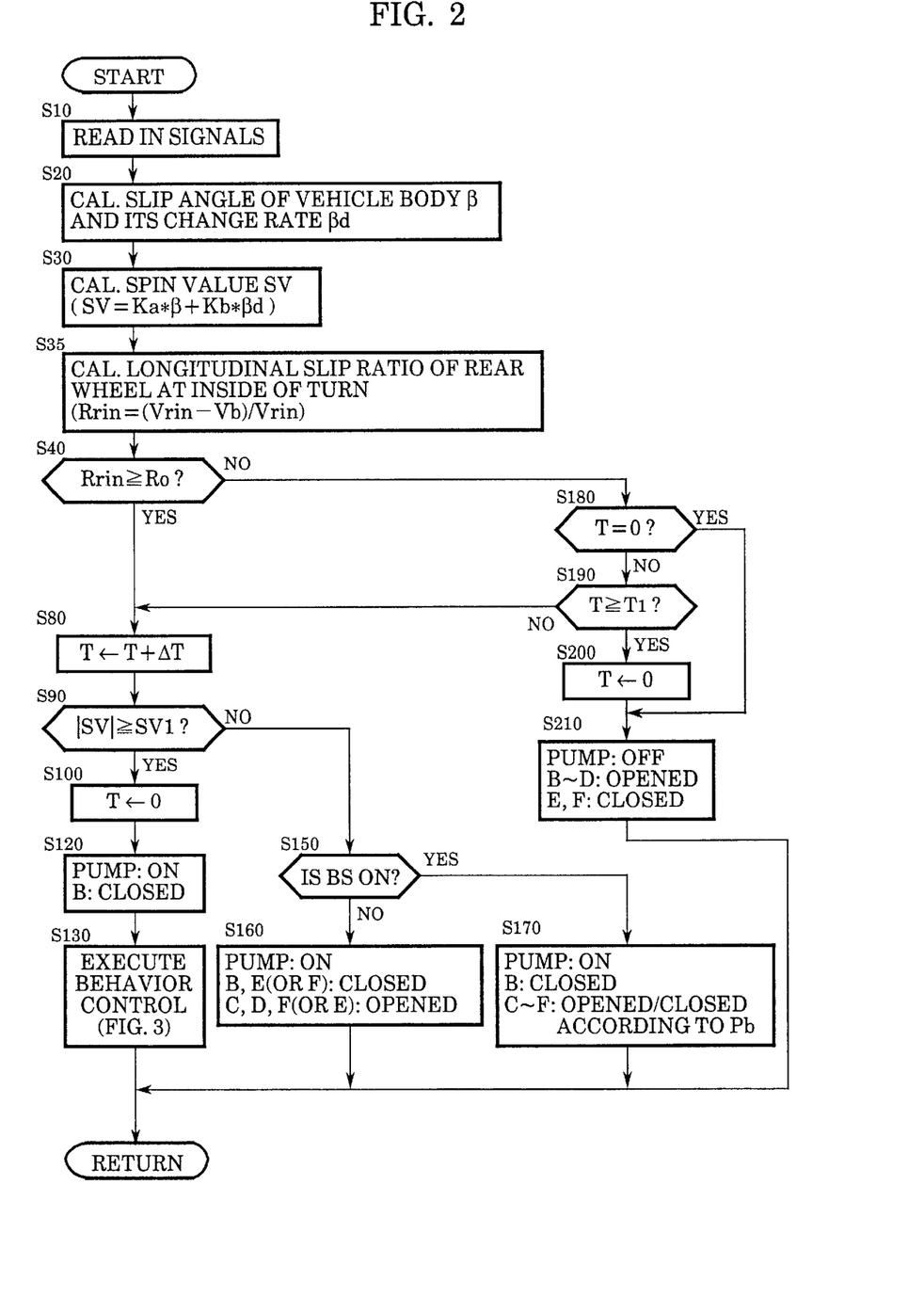
FIG. 2 is a flowchart showing a first embodiment of the brake system according to the present invention in the form of its control operation.

FIG. 2 is a flowchart showing an overall operation of a first embodiment of the brake system according to the present invention. This embodiment is particularly arranged for executing a spin suppress behavior control of a vehicle to suppress the vehicle from spinning when it is making a turn running. However, it will be appreciated that the principle of the present invention is not limited to such a use and is generally applicable to the so-called behavior control of a vehicle based upon a. selective application of braking to a selected wheel or wheels under an automatic control available by electronic computers. The control operation executed according to the steps herein shown is started by a closure of an ignition switch not shown in the figure and is cyclically repeated with a predetermined time interval as well known in the art.

When the control operation is started, in step 10 signals are read in from the vehicle speed sensor 66 and others. Then in step 20, slip angle β of the vehicle body is calculated by first calculating a difference between the lateral acceleration Gy detected by the lateral acceleration sensor 68 and a lateral acceleration calculated as a product of the vehicle speed V detected by the vehicle speed sensor 66 and the yaw rate ν detected by the yaw rate sensor 70, such as Gy–V* γ, then integrating the difference of the lateral acceleration on time basis to obtain side slide velocity Vy, and then dividing Vy by longitudinal velocity Vx of the vehicle detected by the vehicle speed sensor 66 as the vehicle speed V, as (β=Vy/Vx. Then the slip angle β of the vehicle body is differentiated on time basis to obtain with its change rate.

In step 30, a value herein called spin value SV is calculated as a weighed sum of the vehicle body slip angle β and its change rate βd, as SV=Ka* β+Kb* βd, by taking appropriate constants Ka and Kb, as a parameter indicating a liability of the vehicle to spin.

In step 35, the direction of the turn running of the vehicle is detected according to the sign of the lateral acceleration Gy or the yaw rate γ. Gy and γ are generally made positive for left turn and negative for right turn. Then, wheel speed- .Vrin of the rear wheel at the inside of the turn and a standard wheel speed Vb are determined based upon the signals from the wheel speed sensors 76*fl*-76*rr*, wherein the standard wheel speed Vb may be the wheel speed of the front or rear wheel at the outside of-the turn or a mean of the wheel speeds of the front left and right wheels. Then, longitudinal slip ratio of the rear wheel at the inside of the turn, herein denoted as Rrin, is calculated as Rrin =(Vrin—Vb)/NVrin, as a parameter for starting preparation of the brake system to be ready for the spin suppress behavior control as described in detail hereinbelow, with operation of the pump 22*f*.

In step 40, it is judged if Rrin is equal to or greater than a standard value Ro (a positive constant). Here it is noted that, when a vehicle is making a turn running, the longitudinal slip ratio of the rear wheel at the inside of the turn is very informative in forecasting a probable development of the turn running of the vehicle into a spin. When a vehicle is making a turn running, the distribution of the vertical load between the rear left and right wheels shifts to the outside of the turn due to a centrifugal force applied to the rear portion of the vehicle body, correspondingly decreasing the vertical load on the rear wheel at the inside of the turn, and therefore, an increase of the longitudinal slip ratio of the rear wheel at the inside of the turn relative to a standard longitudinal slip ratio detected at other wheels indicates how high the liability of the vehicle to spin has increased. Further, since the friction grip force available by the frictional contact of the wheel tire with the road surface is limited by the so-called friction circle the radius of which shows the magnitude of such a grip force available in 360° directions, so that the vector addition of the longitudinal grip force and the lateral grip force is limited by the radius of the friction circle, an increase of the longitudinal slip ratio of the rear wheel at the inside of the turn indicates a corresponding decrease of the lateral grip force of the rear wheel at the inside of the turn. Therefore, the longitudinal slip ratio Rrin is a parameter which indicates a condition of the vehicle inducible of an instability of running behavior of the vehicle, i.e. spin in the present embodiment, but is not a parameter, such as the above-mentioned spin value SV, which expresses a movement of the vehicle, i.e. side shift of the rear portion of the vehicle in the present embodiment, which, when increases, directly provides the instability of the vehicle, i.e. the spin. Therefore, it is contemplated that when the pump 22*f* in the present case is started according to whether Rrin is equal to or greater than a certain standard value Ro, the raised pressure source of the working fluid in the front high pressure working fluid passage 20*f* is more definitely prepared without delay than when the pump is started by a parameter indicating the movement of the vehicle of the same nature as the instability, such as the spin value SV, reaching a first predetermined small value thereof smaller than a second value thereof at which the braking for the spin suppress control is initiated.

Thus, if the answer of the judgement of step 40 is yes, the control proceeds to step 80 to start the pump 22*f* as described in detail hereinbelow, whereas if the answer is no, the control proceeds to step 180 not to operate or to stop the pump 22*f* as described in detail hereinbelow.

Step 80 is provided to count a time by incrementing a time count of a timer not shown in the figure by an increment ΔT for the purpose of measuring a time duration after the lapse of which, when the pump 22*f* was operated but the spin suppress braking described hereinbelow is not started, the operation of the pump 22*f* is stopped.

In step 90, it is judged if the absolute value of the spin value SV is equal to or greater than a threshold value SV1 determined for starting the spin suppress behavior control described hereinbelow. When the answer of the judgement is yes, the control proceeds to step 100, to reset the above-mentioned timer, and then the control proceeds to step 120, wherein the pump 22*f* is made on, or indeed, kept on. Since the control operation according to the flowchart of FIG. 2 is repeated at a time cycle such as several tens microseconds, when the control process reached step 90 for the first time, the answer of judgement will be infallibly no, so that the control proceeds to step 150, and therefore the pump 22*f* is started in step 160 or 170 as described hereinbelow. Therefore, in step 120, it is only confirmed that the pump is kept in operation. In step 120, the changeover valve 36*f* denoted B for convenience is closed to establish the front high pressure working fluid passage 20*f* independently of the master cylinder 14. Then the control proceeds to step 130, and the spin suppress behavior control is executed as shown in detail in FIG. 3 and described hereinbelow.

When the control proceeds to step 150, it is judged if the brake switch 72 is made on or not, i.e. if the driver is depressing the brake pedal 12 in FIG. 1A. If the answer is no, i.e. the brake pedal is not depressed, the control proceeds to step 160, wherein the pump, i.e. the pump 22*f* in the present case, is started (or kept on in operation when it was already started), the changeover valves 36*f* (B) and one of the changeover valve 50*fl* (denoted E) or the changeover valve 50*fr* (denoted F) are closed (or kept on closed when already closed), and the changeover valves 48*l* and 48*fr* (denoted C and D, respectively) and the other of the changeover valve F or E (opposite to the valve E or F which is closed) are opened (or kept on opened). By such a combination of opened and closed state of the changeover valves, with the operation of the pump 22*f*, a raised pressure source of the working fluid is generated in the front high pressure working fluid passage 20f, while maintaining a circulation of the working fluid through the working fluid circuit to be ready for supplying the-working fluid at a finally raised pressure to the wheel cylinders 54fl or 54fr immediately when required. In this connection, it will be noted that in building up such a preliminarily raised pressure source of the working fluid in the front high pressure working fluid passage 20f, the changeover valves E and F may be both closed to expedite the buildup of the preliminarily raised pressure source to be prepared for a more quick actuation of the wheel cylinders.

When the answer of the judgement in step 150 is yes, i.e. the driver is depressing the brake pedal 12, the control proceeds to step 170, wherein the pump 22f is started (or kept on in operation), the changeover valve B is closed (or kept as closed) and the changeover valves C, D, E and F are appropriately changed over according to the pressure Pb in the front working fluid passage 16f detected by the pressure sensor 78, showing the driver's will for braking, so that a highly raised pressure source of the working fluid is prepared in the front high pressure working fluid passage 20f in harmony with the driver's will for braking.

When the control proceeded to step 180 according to the negative judgement in step 40, it is judged if the time count T of the above-mentioned time counter is 0 or not. If the answer is yes, it means that the control process has never yet proceeded through step 80 and subsequent steps, with no operation of the pump. In this case, therefore, the control proceeds immediately to step 210, wherein the pump is stopped, or indeed, the pump is kept in the stopped condition, while the changeover valves B, C and D are opened, or indeed kept as opened, and the changeover valves E and F are closed, or indeed kept as closed, as in the initial state shown in FIG. 1A.

When the control reached step 180 after the control has once proceeded through step 80, so that the pump was started, the judgement of step 180 is no, and therefore the control proceeds to step 190. In step 190, it is judged if the time count T is equal to or greater than a predetermined threshold value $T_1$. This threshold time value is determined appropriately in view of the performance of the spin suppressed by the brake system according to the present invention, and described hereinbelow with reference to FIG. 5. Until the time lapses the threshold value $T_1$, the control proceeds to step 80, and the pump operation and the brake control or at least the pump operation is still continued until |SV| subsides below SV1 and then the time duration T1 lapses.

When the judgement of step 190 turns into yes, the control proceeds to step 200, and after resetting the time counter, the control proceeds to step 210, wherein the pump 22f is stopped, the changeover valves B, C and D are opened, and the changeover valves E and F are closed, thus ending a one time operation of the brake system according to the present invention.

Figure 3:
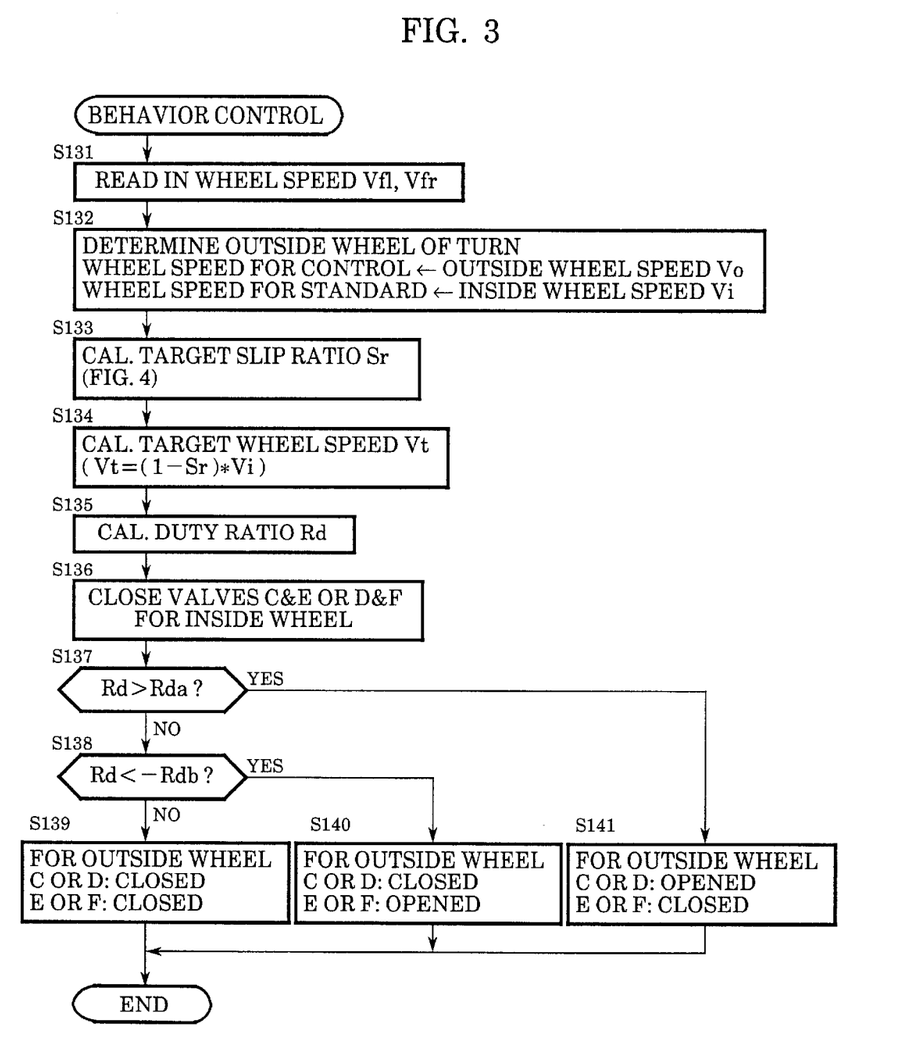
FIG. 3 is a flowchart showing a further detail of the control operation by step, 130 of the flowchart of FIG. 2.

The detail of the spin suppress behavior control executed in step 130 is shown in FIG. 3 in the form of a flowchart. In this subroutine, in step 131, wheel speeds Vfl and Vfr of the front left and front right wheels are read in.

In step 132, it is determined which of the front left wheel or the front right wheel is the wheel operating at the outside of the turn. Then, the wheel speed Vo of the wheel at the outside of the turn is made a wheel speed for control, while the wheel speed Vi of the wheel at the inside of the turn is made a wheel speed for standard.

As well known in the art, a judge-and-bypass steps may be incorporated with regard to step 132, such that the control process passes step 132 only in the first cycle during a one time control and bypasses it in the second and subsequent cycles of the control.

Figure 4:
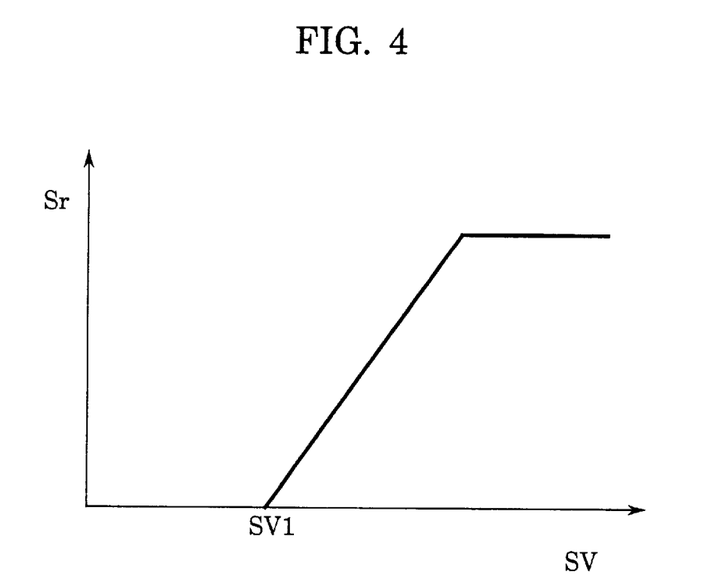
FIG. 4 is a map for calculating longitudinal slip ratio Sr of a wheel to be braked based upon a parameter called spin value.

In step 133, by referring to a map such as shown in FIG. 4, based upon the spin value SV calculated in step 30 of FIG. 2, a target longitudinal slip ratio Sr is obtained.

In step 134, a target wheel speed Vt for the front wheel at the outside of the turn is calculated as follows:

$$Vt=(1-SR)*Vi$$

In step 135, a duty ratio Rd for supplying a raised fluid pressure to the wheel cylinder of the front wheel at the outside of the turn, i.e. ratio of the balance between the time duration for opening the changeover valve C or D while closing the changeover valve E or F and the time duration for closing the changeover valve C or D while opening the changeover valve E or F to a cycle time of the on/off control of the changeover valves is calculated as a weighted sum of the difference between Vo and Vt and its change rate, by taking appropriate proportioning constants Kp and Kd, as follows:

$$Rd=Kp*(Vo-Vt)+Kd*t(Vo-Vt)/dt$$

In step 136, changeover valves C and E or D anal F corresponding to the front wheel at the inside of the turn are closed, because it is the front wheel at the outside of the turn which is braked to suppress the vehicle from spinning by generating a turning moment in the vehicle which counteracts the spinning movement of the vehicle.

In step 137, it is judged if the duty ratio Rd is greater than a predetermined positive threshold value Rda. If the answer is yes, the control proceeds to step 141, wherein the changeover valve C or D is opened while the changeover valve E or F is closed for the front wheel at the outside of the turn to be braked. If the answer of step 137 is no, the control proceeds to step 138 and it is judged if the duty ratio Rd is smaller than a negative threshold value—Rdb. If the answer is yes, the control proceeds to step 140, wherein the changeover valve C or D is closed while the changeover valve E or F is opened for the wheel at the outside of the turn to be released from braking. When the answer of step 138 is no, the control proceeds to step 139, wherein the changeover valve C or D is closed while the changeover valve E or F is also closed for the wheel at the outside of the turn to be kept at the present state of braking. It is to be noted that all of the steps 139, 140 and 141 are executed each time for only a short period of the cycle time of control, so that the pressure of the working fluid existing in the corresponding wheel cylinder is controlled generally within a range corresponding to—Rdb to Rda centered at Rd.

Figure 5:
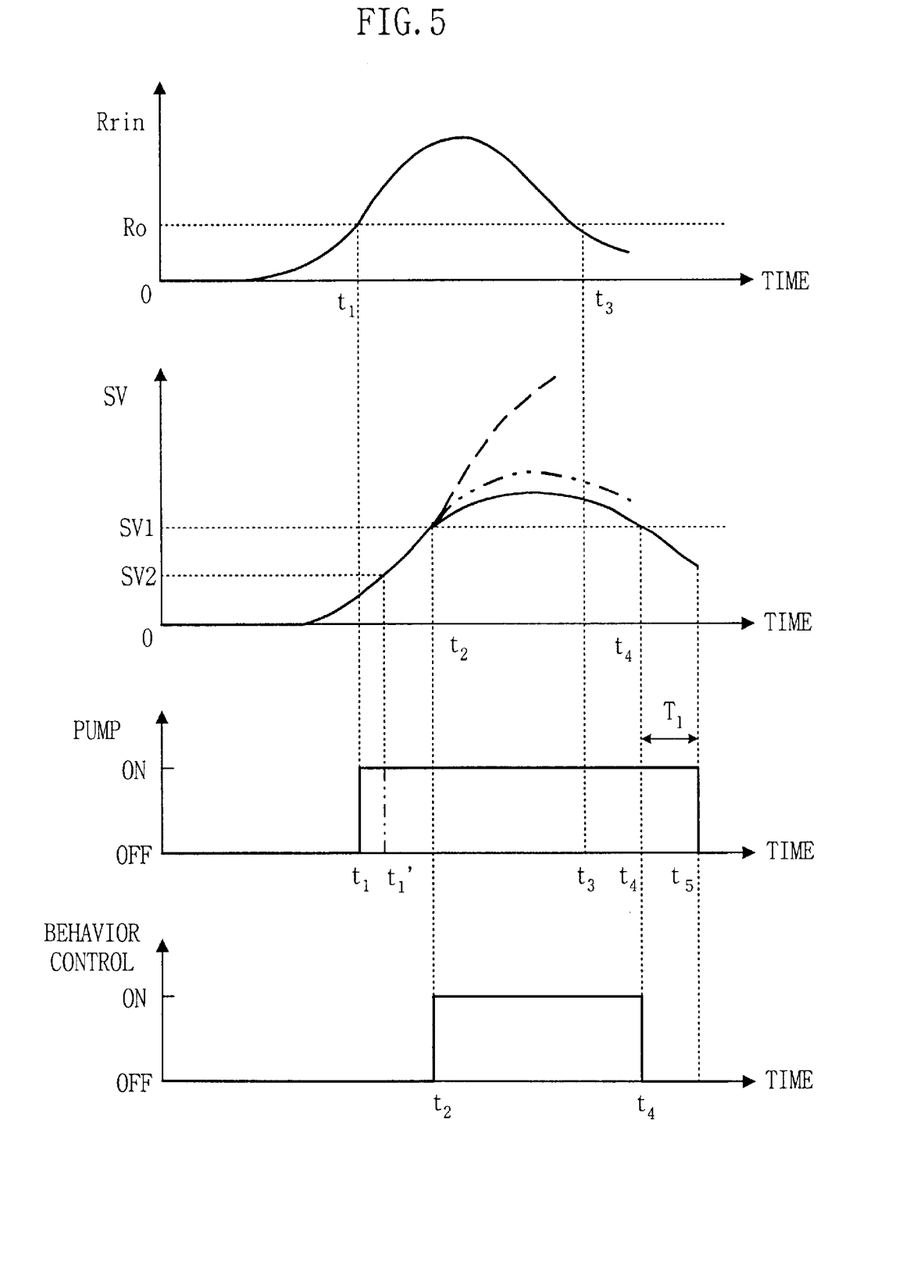
FIG. 5 is a set of diagrams showing the relationship among timebased performances of longitudinal slip ratio Rrin, spin value SV, on/off of the pump operation and on/off of a behavior control.

FIG. 5 shows an example of time based performances of the longitudinal slip ratio Rrin of the rear wheel at the inside of the turn during a turn running of a vehicle, the spin value SV, the on/off of the pump for the spin suppress control and the on/off of the spin suppress behavior control. When Rrin increases across the threshold value Ro at time point $t_1$, the pump 22f is started to operate. When the threshold value Ro is judiciously determined in relation to the threshold value SV1, it will be definitely ensured that the time point $t_1$, occurs well before the threshold value increases across the threshold value SV1. When the spin value SV increases across the threshold value SV1 at time point $t_2$, the spin suppress behavior control is started. By the execution of the spin suppress control, the spin value SV will be suppressed not to increase much beyond the threshold value SV1 to soon subside below the threshold value SV1 at time point $t_4$. In the meantime, Rrin will also subside below Ro at time point $t_3$.

In the diagram of the spin value SV, the broken line shows a case that no spin suppress behavior control is applied to, while a dot-dash line shows a case that the spin suppress behavior control is executed with the pump being started by the spin value SV reaching a threshold value such as SV2 smaller than the threshold value SV1, provided that SV2 is determined to be large enough to forecast the need of the pump operation without too much precaution in forecasting but not too late for forecasting, such as to start the pump at time point $t_1'$.

The time duration $T_1$ of step 190 of FIG. 2 may be appropriately determined, so as to confirm the subsidence of the spinning movement of the vehicle, and not to cause a hunting of the control operation.

Figure 6:
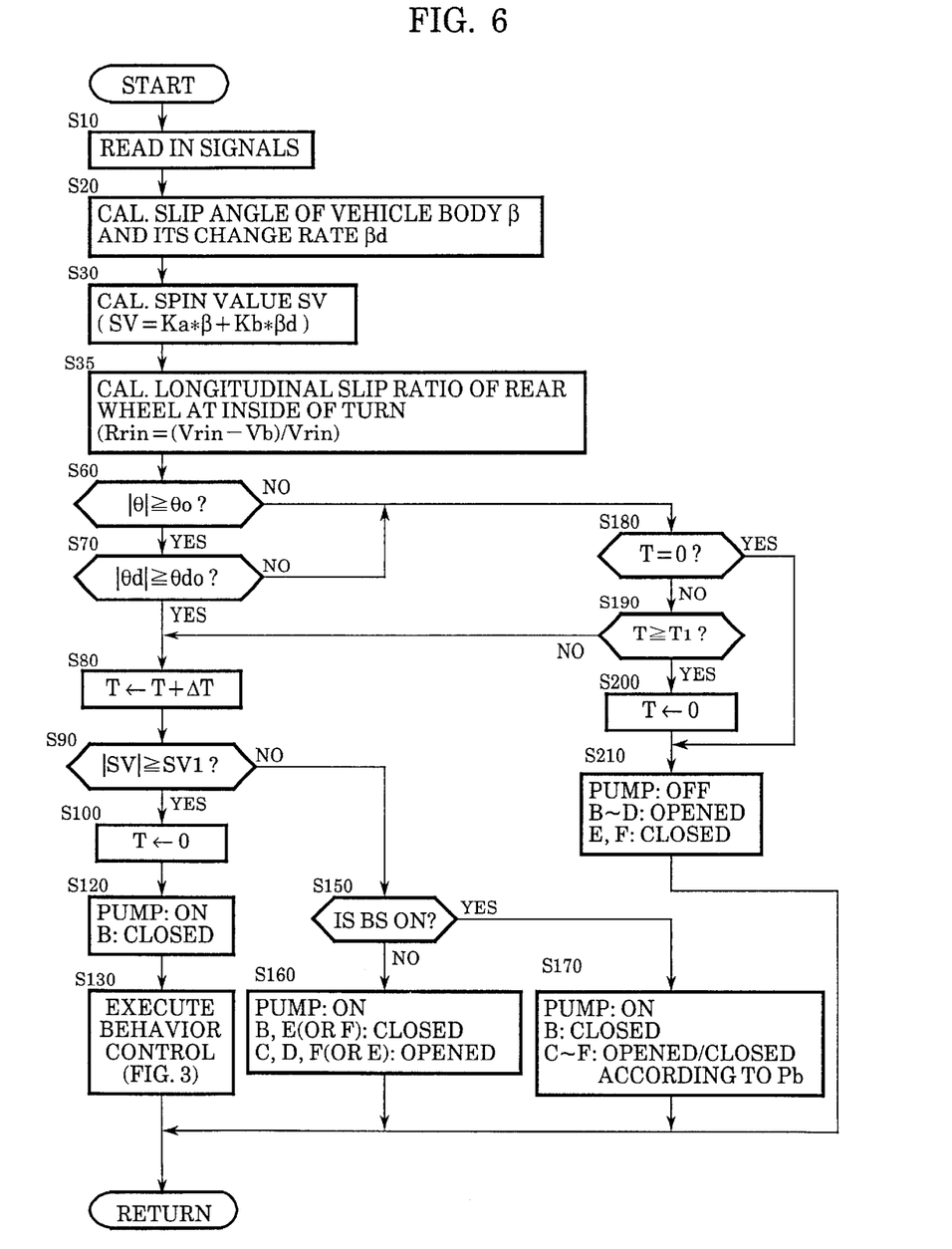
FIG. 6 is a flowchart similar to FIG. 2, showing a second embodiment of the brake system according to the present invention in the form of its operation control.

FIG. 6 is a flowchart similar to FIG. 2, showing another embodiment of the braking system according to the present invention. In FIG. 6, the steps corresponding to those shown in FIG. 2 are designated by the same step numbers. Since the controls executed in those common steps are the same as executed in the control of FIG. 2, the descriptions of those common steps will be omitted to avoid a redundancy of the description.

In the control according to FIG. 6, in place of step 40 of FIG. 2 for judging the time point for starting the operation of the pump 22f based upon the above-mentioned Rrin, in step 60 it is judged if the absolute value of the steering angle detected by the steering angle sensor 74 is equal to or greater than a threshold value θ o determined as a lower limit of the steering angle for starting the operation of the pump 22f. The value of θ is also generally made positive when the vehicle is steered to the left and made negative when the vehicle is steered to the right. When the answer is no, the control proceeds to step 180, whereas if the answer is yes, the control proceeds to step 70.

In step 70, it is judged if the absolute value of change rate θ d of the steering angle is equal to or greater than a threshold value θ do also determined as a lower limit for starting the operation of the pump 22f. If the answer is no, the control proceeds to step 180, whereas if the answer is yes, the control proceeds to step 80. Therefore, it will be noted that in making the positive judgment of starting the pump and further executing the behavior control, the judgment regarding the speed of steering has a priority over the judgment regarding the magnitude of the steering angle. The threshold values θ o and θ do are determined to be not so large as to fail in forecasting the need of pump operation but not so small as to start the pump so often uselessly.

Figure 7:
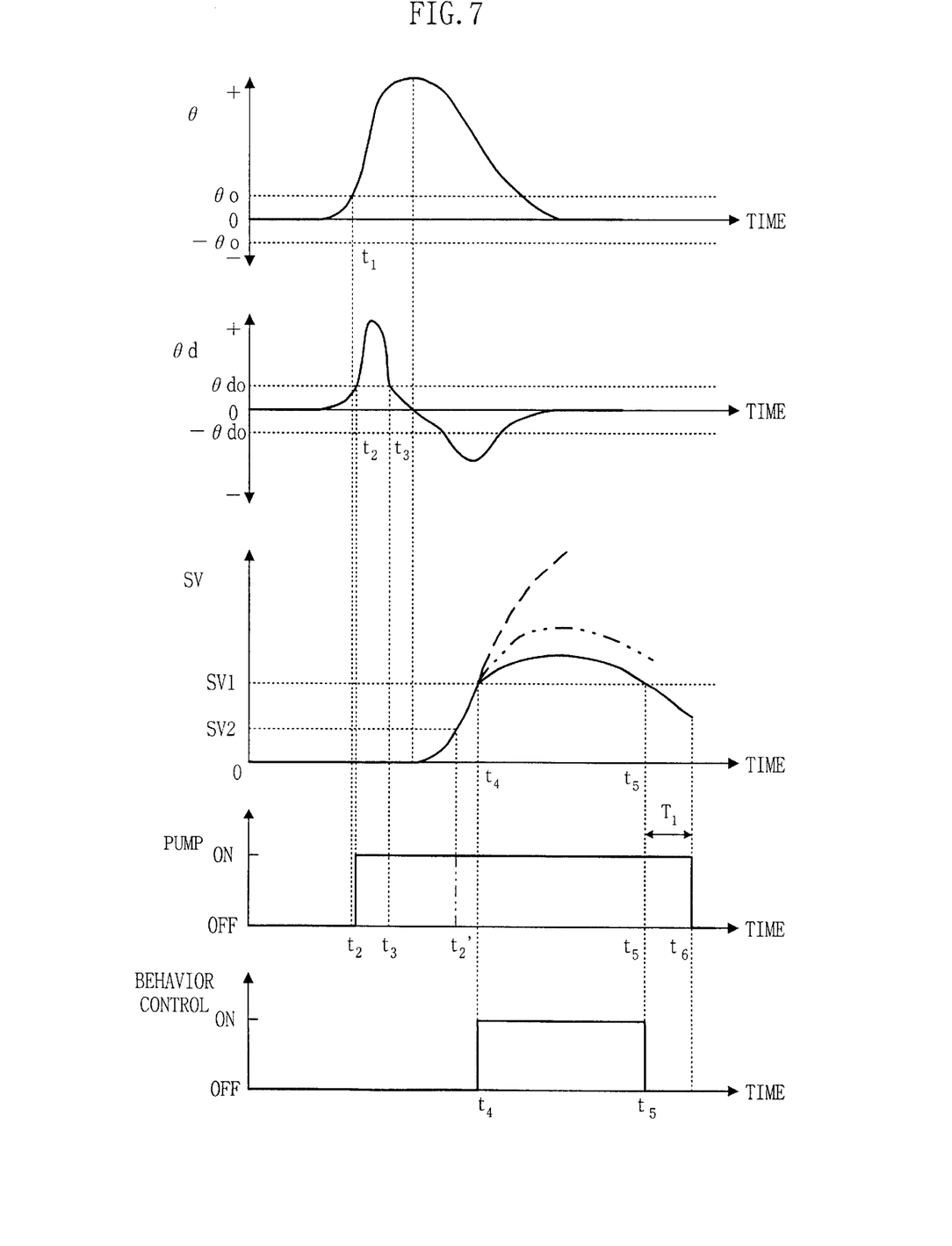
FIG. 7 is a set of diagrams similar to FIG. 5, showing the relationship among time-based performances of steering angle θ, change rate of steering angle θ d, spin value SV, on/off of the pump operation and on/off of a behavior control.

FIG. 7 is a set of diagrams similar to that of FIG. 5, showing an example of the time based performances of the steering angle θ, the change rate of the steering-angle θ d, the spin value SV, the on/off of the pump, and the on/off of the spin suppress behavior control. However, time points $t_1$–$t_6$ in FIG. 7 have no correspondence to those of FIG. 5. The time points $T_{1-t5}$ and $t_1$–$t_6$ in FIGS. 5 and 7 should be referred to only as a series of consecutive time points in the respective diagrams.

As will be noted in FIG. 7, the pump is started at time point $t_2$ at which the change rate θ d of the steering angle θ increases across the threshold value θ do after the steering angle θ was increased to be larger than the threshold value θ o at time point $t_1$.

In FIG. 7, the broken line about the spin value SV shows a case that no spin suppress behavior control is applied to, while the dot-dash line about the spin value SV shows a case that the pump is started by the spin value SV increasing across a threshold value SV2, as described with reference to SV2 of FIG. 5.

Figure 8:
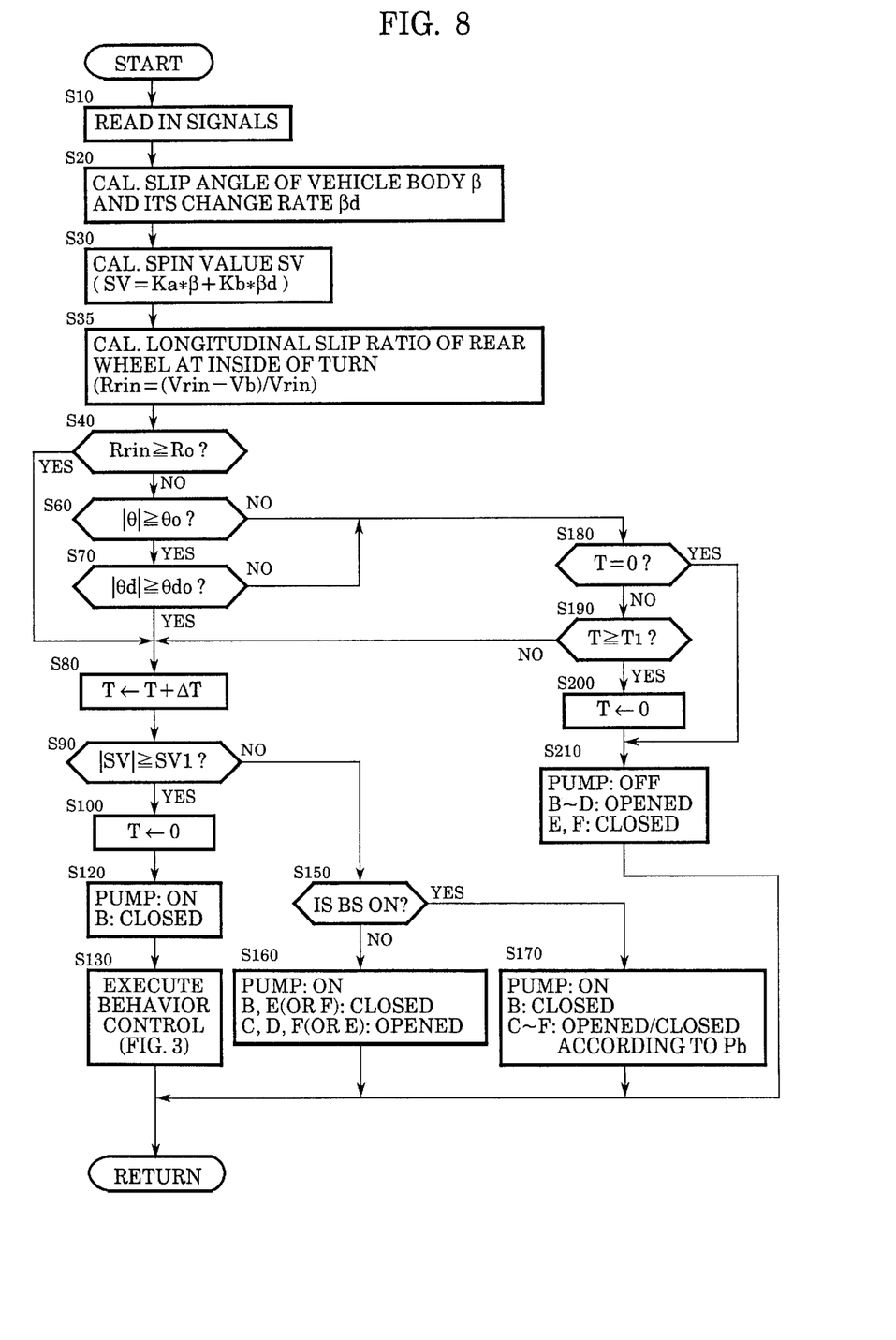
FIG. 8 is a flowchart similar to FIGS. 2 and 6, showing a third embodiment of the brake system according to the present invention, indeed a combination of the brake systems shown in FIGS. 2 and 6, in the form of its control operation.

FIG. 8 is a flowchart similar to FIGS. 2 and 6, showing still another embodiment of the brake system according to the present invention, or indeed, the embodiment of FIG. 8 is a combination of the embodiments of FIGS. 2 and 6. In FIG. 8, the steps corresponding to those shown in FIG. 2 and/or FIG. 6 are shown by the same step numbers. Since the controls executed in those common steps are the same as executed in the control of FIG. 2 or 6, the descriptions of those common steps will be omitted to avoid a redundancy of the description. As will be noted, the flowchart of FIG. 8 is an additional incorporation of step 40 into the flowchart of FIG. 6. According to the embodiment of FIG. 8, the pump is started at least when either Rrin increases across RO, or |θ| increases across θ o and |θ d| increases across θ do.

As a further modification, when the brake system comprises the pressure sensors 80fl–80rr for detecting the working fluid pressures in the respective wheel cylinders 54fl–54rr, the steps 133–135 of FIG. 3 are cancelled, and step 137 judges if the working fluid pressure (assumed as Pwo) in the wheel cylinder 54fl or 54fr of the front wheel at the outside of the turn is smaller than a first threshold value (assumed as Pa), i.e. if Pwo<Pa, and if the answer is yes, the control proceeds to step 141, whereas if the answer is no, the control proceeds to step 138, wherein it is judged if the above-pressure Pwo is greater than a second threshold value (assumed Pb), i.e. if Pwo>Pb, and if the answer is yes, the control proceeds to step 140, whereas if the answer is no, the control proceeds to step 139. By such a modification, the fluid pressure in the wheel cylinder of the front wheel at the outside of the turn is controlled to be in a pressure range between Pa and Pb adapted the spin suppress control.

Although the invention has been described in detail with respect to several embodiments and some modifications thereof, it will be apparent for those skilled in the art that various other embodiments and/or modifications thereof are possible without departing from the spirit of the present invention.

What is claimed is:

1. A brake system of a vehicle having a vehicle body and front left, front right, rear left and rear right wheels, comprising:

a reservoir;

a plurality of wheel cylinders, each wheel cylinder applying a braking force to a corresponding one of the front left, front right, rear left and rear right wheels when supplied with a working fluid at a raised pressure;

an inlet passage means adapted to supply the working fluid to said wheel cylinders;

a pump means for pumping the working fluid from said reservoir to said inlet passage means to provide a raised pressure source of the working fluid in said passage means;

fluid circuit means including fluid flow control valves for selectively conducting the working fluid from said inlet passage means to each one of said wheel cylinders; and an automatic control means for controlling said pump means and said fluid flow control valves, wherein said automatic control means comprises:

a first means for obtaining a first parameter related to running of the vehicle; and a second means for obtaining a second parameter related to the running of the vehicle and different from said first parameter in a time-based changing performance thereof, said first and second parameters each relating to a probable requirement for applying braking force to at least one wheel selected from the front left, front right, rear left and rear right wheels for a stability control of the vehicle by successively reaching first and second threshold values, respectively, in said order according to an increase in need for said stability control, said automatic control means controlling said pump means and said fluid flow control valves such that, when said first parameter reaches said first threshold value, said pump means is started for operation thereof so as to provide said raised pressure source in said inlet passage means while said flow control valves deal with said raised pressure source not to supply any of the wheel cylinders with such a raised pressure based upon said raised pressure source as to effect a substantial braking thereby, and when said second parameter reaches said second threshold value, the wheel cylinder or wheel cylinders corresponding to said selected wheel or wheels are supplied with such a raised pressure based upon said raised pressure source as to effect a substantial braking thereby.

2. A brake system according to claim 1, wherein said first parameter is a longitudinal slip ratio of a rear wheel operating at the inside of a turn running of the vehicle, while said second parameter is the absolute value of a spin value based upon slip angle of the vehicle body representing a liability of the vehicle to spin, said automatic control means controlling said flow control valves so as to supply said raised pressure to effect said substantial braking to either the front left or front right wheel operating at the outside of the turn running of the vehicle.

3. A brake system according to claim 2, wherein said automatic control means stops said pump means once started when a predetermined time lapses after subsidence of the absolute value of said spin value below said second threshold value.

4. A brake system according to claim 1, wherein the vehicle is a front steered vehicle having a front steering system, said first parameter being the absolute value of a change rate of steering angle of the front steering system, while said second parameter is the absolute value of a spin value based upon slip angle of the vehicle body representing a liability of the vehicle to spin, said automatic control means controlling said flow control valves so as to supply said raised pressure to effect said substantial braking to either the front left or front right wheel operating at the outside of the turn running of the vehicle.

5. A brake system according to claim 4, wherein said automatic control means stops said pump means once started when a predetermined time lapses after subsidence of the absolute value of said spin value below said second threshold value.

6. A brake system according to claim 5, wherein said automatic control means detects the absolute value of the change rate of the steering angle to reach said first threshold value only when the absolute value of a steering angle is equal to or greater than a third threshold value for the steering angle.

7. A brake according to claim 6, wherein said automatic control means detects the absolute value of the steering angle to be equal to or greater than said third threshold value for the steering angle only when longitudinal slip ratio of the rear left or rear right wheel operating at the inside of the turn running of the vehicle is smaller than a fourth predetermined threshold value for the longitudinal slip ratio, while said automatic control means starting said pump means to operate when the longitudinal slip ratio of the rear left or rear right wheel operating at the inside of the turn running of the vehicle is equal to or greater than said fourth threshold value for the longitudinal slip ratio.

8. A brake system according to claim 1, wherein said automatic control means controls said fluid flow control valves so as to generate a circulation of the working fluid through said fluid circuit means by said raised pressure source in said inlet passage means when said first parameter has reached said first threshold value while said second parameter has not yet reached said second threshold value.

* * * * *